G. WIBORN.
SAW-FILING MACHINE.

No. 179,750.　　　　　　　　　Patented July 11, 1876.

WITNESSES:
H. W. Almqvist
John Goethals

INVENTOR:
G. Wiborn
BY
Munn & Co
ATTORNEYS.

UNITED STATES PATENT OFFICE.

GERSHOM WIBORN, OF MANISTEE, MICHIGAN.

IMPROVEMENT IN SAW-FILING MACHINES.

Specification forming part of Letters Patent No. 179,750, dated July 11, 1876; application filed May 22, 1876.

*To all whom it may concern:*

Be it known that I, GERSHOM WIBORN, of Manistee, Manistee county, State of Michigan, have invented a new and Improved Saw-Filing Machine, of which the following is a specification:

This invention consists of a head in which a frame is supported, in which the reciprocating file-carrying rod works, the said head being a solid block, with a bifurcated extension of one side forming a couple of legs, which straddle the saw, and fasten the head to it by set-screws, and one leg carries an adjustable rod, which holds a gage, by which the position of the head is gaged from the collar of the saw-arbor. The pivot-connection of the reciprocating rod-holding frame is adjustable in the head, to regulate the inclination of the file to bevel the top of the tooth, and said frame is adjustable, to adjust the file for the bevel of the front of the tooth, so that the file may be fixed for making both of these angles without changing either of its inclinations.

Figure 1:
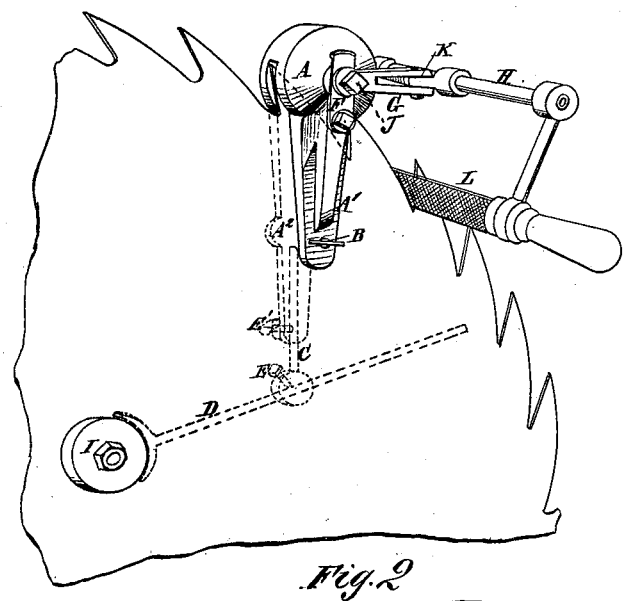
Figure 2:
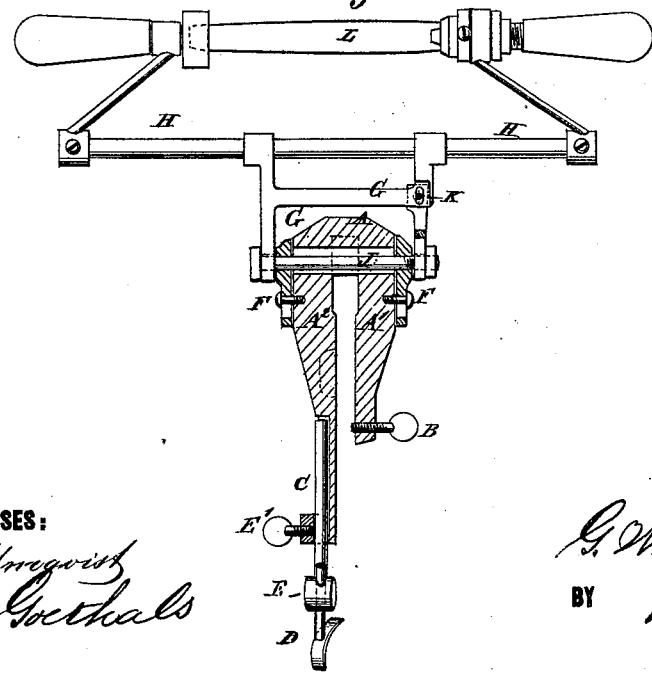

In the accompanying drawing, Figure 1 is a perspective view of a saw with my improved filing-machine applied, and Fig. 2 is a sectional elevation.

A represents the head for holding the reciprocating file-carrying rod H on the saw. Said head has a bifurcated extension, forming legs A¹ and A², which straddle the saw, so that the head rests on a couple of teeth, as shown in Fig. 1, and one has a set-screw, B, to screw the head fast to the saw. The other one has the adjustable gage-holder C fitted in it, and provided with a set-screw, E', to hold it in the position desired. This gage-holder carries the gage D, by which the file-holder is gaged to the saw by the collar I. G is the frame in which the file-carrying rod H is mounted. It is connected to head A by the rod J, and one of its arms is extensible at K, to set the file L to the required angle for the front of the tooth, and the rod J is adjustable in the head by the shifting boxes F, to set the file for the bevel of the back of the tooth.

The inclinations of the file-rod will be reversed for the teeth beveled the reverse way, and the file-handles may be shifted to the other side of the saw, if desired.

It will be seen that the file can be set for both sides of the tooth at the same time, so that it only requires to be shifted from one side of the tooth to the other, and be turned in the axis of the handle for filing both sides, and being once set, all the teeth beveled one way may be filed by shifting the holder along from tooth to tooth, as required.

Having thus described my invention, I claim as new and desire to secure by Letters Patent—

1. The head A, having the bifurcated extension A¹ A², binding-screw B, adjusting guide-holder C, and guide D, substantially as herein shown and described.

2. The file-rod-holding frame G, connected to head A by the adjustable pivot-bolt J, substantially as herein shown and described.

3. The file-rod-holding frame G, having an adjusting-arm, K, and being coupled to head A by the adjustable pivot J, substantially as herein shown and described.

GERSHOM WIBORN.

Witnesses:
 FRANK L. RAY,
 ALLEN MCKEE.